United States Patent
Bai et al.

(10) Patent No.: US 9,715,258 B1
(45) Date of Patent: Jul. 25, 2017

(54) HIGH-DENSITY DISK ARRAY ENCLOSURE

(71) Applicant: Cisco Technology, Inc., San Jose, CA (US)

(72) Inventors: Yun Bai, Shanghai (CN); Le Gao, Shanghai (CN); Qiang Li, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/077,929

(22) Filed: Mar. 23, 2016

(30) Foreign Application Priority Data

Mar. 9, 2016 (CN) .......................... 2016 1 0133065

(51) Int. Cl.
*G06F 1/18* (2006.01)
*H01R 12/70* (2011.01)
*H01R 12/73* (2011.01)

(52) U.S. Cl.
CPC .............. *G06F 1/187* (2013.01); *G06F 1/186* (2013.01); *H01R 12/7088* (2013.01); *H01R 12/737* (2013.01)

(58) Field of Classification Search
CPC combination set(s) only.
See application file for complete search history.

(56) References Cited

U.S. PATENT DOCUMENTS

| | | | |
|---|---|---|---|
| 5,406,450 A * | 4/1995 | Shieh | G06F 1/184 361/679.37 |
| 5,586,003 A | 12/1996 | Schmitt et al. | |
| 7,068,500 B1 * | 6/2006 | Beinor, Jr. | G06F 1/182 174/254 |
| 7,106,577 B2 * | 9/2006 | Shih | G06F 1/184 248/535 |
| 7,193,856 B2 * | 3/2007 | Hidaka | G11B 33/126 211/190 |
| 7,346,913 B2 | 3/2008 | Ishimine et al. | |
| 7,394,660 B2 * | 7/2008 | Hidaka | G11B 33/126 361/724 |
| 7,481,679 B1 * | 1/2009 | Stotz | H01R 12/725 439/638 |
| 7,492,061 B2 * | 2/2009 | Beyers | G11B 33/124 307/85 |
| 7,593,225 B2 * | 9/2009 | Sasagawa | G06F 1/187 165/104.33 |

(Continued)

FOREIGN PATENT DOCUMENTS

| | | |
|---|---|---|
| EP | 001065752 | 1/2001 |
| GB | 701796 | 1/1954 |

OTHER PUBLICATIONS

DDRDRIVE X1, by Driveforspeed at en wikipedia (Jun. 1, 2009) Can be seen at: https://commons.wikimedia.org/wiki/File:Ddrdrive_x1.jpg#/media/File:Ddrdrive_.jpg "Ddrdrive x1" by Driveforspeed at en.wikipedia. Licensed under CC BY 3.0 via Commons.

*Primary Examiner* — Lisa Lea Edmonds
(74) *Attorney, Agent, or Firm* — Samuel M. Katz

(57) ABSTRACT

In one embodiment a disk array enclosure includes: a two rack (2RU) enclosure configured with a multiplicity of rows of backplane slots on an inner bottom panel of the 2RU enclosure, a multiplicity of 2.5 inch disks mounted lengthwise in parallel to the inner bottom panel, and a multiplicity of paddle cards, each connected to one of the 2.5 inch disks and slotted into one of the backplane slots.

13 Claims, 5 Drawing Sheets

(56) References Cited

U.S. PATENT DOCUMENTS

| | | | |
|---|---|---|---|
| 7,644,420 B2 | 1/2010 | Korikawa | |
| 7,864,519 B2* | 1/2011 | Lin | G11B 33/128 |
| | | | 361/679.33 |
| 8,508,928 B2 | 8/2013 | Killen et al. | |
| 8,749,966 B1* | 6/2014 | Boudreau | G06F 1/187 |
| | | | 361/679.33 |
| 8,922,987 B2* | 12/2014 | Lin | H05K 7/1489 |
| | | | 312/223.1 |
| 9,325,086 B2* | 4/2016 | Brodsky | H01R 12/716 |
| 2003/0147220 A1* | 8/2003 | Fairchild | G06F 1/184 |
| | | | 361/726 |
| 2006/0012950 A1* | 1/2006 | Shih | G06F 1/184 |
| | | | 361/679.33 |
| 2007/0053169 A1* | 3/2007 | Carlson | G11B 33/12 |
| | | | 361/727 |
| 2007/0233781 A1* | 10/2007 | Starr | G11B 33/126 |
| | | | 709/203 |
| 2008/0239656 A1* | 10/2008 | Sasagawa | G06F 1/187 |
| | | | 361/679.37 |
| 2009/0091883 A1* | 4/2009 | Fukuda | G11B 33/022 |
| | | | 361/679.33 |
| 2012/0113582 A1* | 5/2012 | Hirano | G06F 1/187 |
| | | | 361/679.33 |
| 2013/0155604 A1* | 6/2013 | Lin | H05K 7/1489 |
| | | | 361/679.37 |
| 2014/0065878 A1* | 3/2014 | Huang | H01R 12/724 |
| | | | 439/540.1 |
| 2014/0204525 A1* | 7/2014 | Pecone | H05K 13/00 |
| | | | 361/679.33 |
| 2015/0316964 A1* | 11/2015 | Albert | G06F 1/187 |
| | | | 361/679.36 |
| 2015/0355685 A1* | 12/2015 | Hirano | G06F 1/181 |
| | | | 361/679.33 |

\* cited by examiner

HIGH-DENSITY DISK ARRAY ENCLOSURE

FIELD OF THE INVENTION

The present invention generally relates to disk array enclosures.

BACKGROUND OF THE INVENTION

Two rack unit (2RU) disk array enclosures are known in the art. There are two popular options for configuring a 2RU enclosure to store 2.5 inch disks. In a front panel option, the enclosure is configured with a multiplicity of slots that facilitate mounting the disks side-by-side across along the front panel opening of the enclosure, with each disk extending lengthwise towards a backplane on the inside rear panel of the enclosure. The number of disks that may be mounted in such fashion is a function of the form factor of the disk housing; at least twenty four disks may be mounted side-by-side for commonly used form factors. Cables are used to connect each disk to the backplane.

In an extendable drawer option, the enclosure is configured with two extendable drawers, each of which is configured to support up to three rows of five disks apiece laid flat on the drawer, thereby supporting a total of fifteen disks to a drawer, and a total of thirty disks to an enclosure. As with the front panel option, the disks on the drawers are connected via cables to the backplane on the rear panel of the enclosure.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A disk array enclosure includes: a two rack (2RU) enclosure configured with a multiplicity of rows of backplane slots on an inner bottom panel of the 2RU enclosure, a multiplicity of 2.5 inch disks mounted lengthwise in parallel to the inner bottom panel, and a multiplicity of paddle cards, each connected to one of the 2.5 inch disks and slotted into one of the backplane slots. A paddle card includes: a first connector configured to connect to a hard disk's signal/power connector, a second connector disposed at an approximately 90 degree angle from the first connector and configured to connect to a backplane slot, and internal circuitry configured to provide connectivity between the first and second connectors.

Detailed Description of Example Embodiments

Existing options for configuring 2RU enclosure to house 2.5 inch disks are typically inefficient and cumbersome. For example, mounting a row of disks across the front panel opening effectively wastes over half of the interior volume of a 2RU enclosure, and the cable connections to the backplane may be unwieldy to manage. Similarly, the drawers in an extendable drawer configuration use space that may otherwise be used to house disks, and the drawers and connecting cables may become tangled when extending the drawers to service the disks.

It will be appreciated by one of ordinary skill in the art that the options for configuring a 2RU enclosure to store 2.5 inch disks are constrained by the form factor of both the enclosure and the disks. A typical 2RU enclosure may measure 17.53 (width)×26.17 (length)×3.42 (height) inches; 2.5 inch disks, including their housing, typically measure 2.75×0.275×3.945 inches, or 2.75×0.275–0.59×3.945 inches. It will be appreciated that the actual dimensions may vary slightly from manufacturer to manufacturer and/or from product to product. Furthermore, the actual useable space within a given enclosure may be a function of the thickness of the enclosure's panels and/or mounting implements used to mount the disks within the enclosure and/or to position the enclosure within a larger unit.

An additional constraining factor is that the disk's signal/power connector, e.g., a serial general purpose input/output (SGPIO) bus according to the SFF 8485 standard, may have to be positioned to provide access to the enclosure's backplane, either by direct connection or via connecting cable. Accordingly, the length of the disk may have to be mounted perpendicular to the backplane in order to support a direct connection to the backplane. However, since the disk's length of almost four inches is greater than the approximately 3.5 inch height of the enclosure, this constraint may appear to effectively preclude a cable-free option of direct connection to a backplane positioned along an inside bottom panel of the enclosure.

Figure 1:
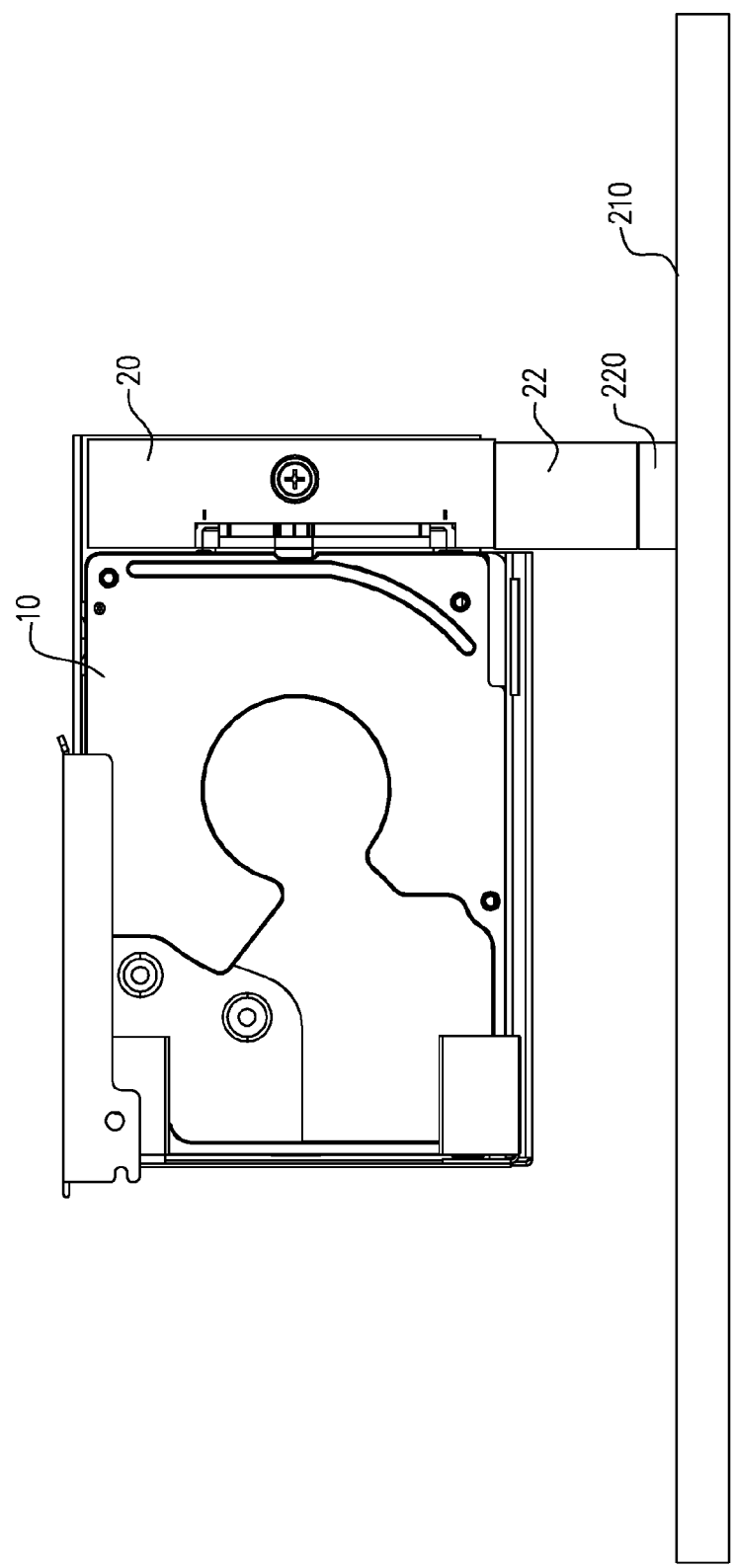
FIG. 1 is a simplified pictorial illustration of a 2.5 inch disk with attached paddle card slotted into a backplane, constructed and operative in accordance with embodiments described herein.

However, in accordance with embodiments described herein, means may be provided to effectively rotate the direction of a disk's signal/power connector in order to support a direct connection to a backplane that is positioned generally in parallel to the length of the disk. Reference is now made to FIG. 1 which is a simplified pictorial illustration of a 2.5 inch disk 10 with an attached paddle card 20 slotted into a backplane slot 220, constructed and operative in accordance with embodiments described herein. As depicted in FIG. 1, disk 10 may be positioned generally in parallel to inside bottom panel 210; as will be described hereinbelow, inside bottom panel 210 may represent the inside bottom panel of a 2RU disk enclosure. Paddle card 20 may be connected to disk 10 using any suitable means, including for example, the disk's signal/power connector (not shown) and/or screws or other fasteners such as known in the art. Paddle card 20 may comprise backplane connector 22 which as depicted may be configured to slot into backplane slot 220, thereby providing connectivity between disk 10 and backplane slot 220. It will be appreciated by one of ordinary skill in the art that while disk 10 may be positioned generally in parallel to inside bottom panel 210, the embodiments described herein may support disk 10 being positioned at a slight angle opposite inside bottom panel 210, within the constraints provided by a top panel (not shown) of the 2RU disk enclosure.

It will be appreciated by one of ordinary skill in the art that paddle card 20 may be configured to receive power from backplane slot 220 and conduct the power to disk 10 via the signal/power connector. Paddle card 20 may be similarly configured to transmit command and data signals between disk 10 and backplane slot 220.

Figure 2:
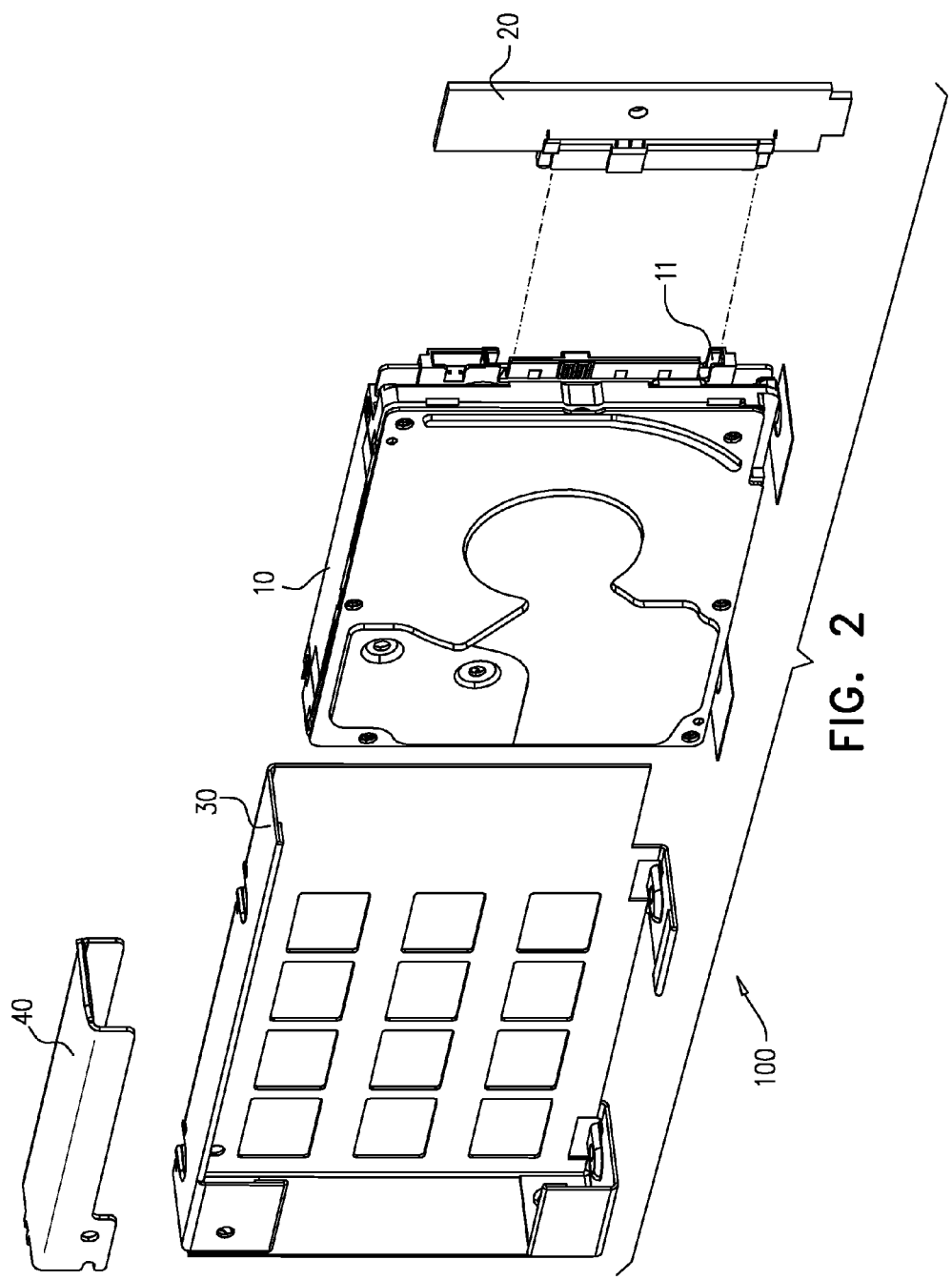
FIGS. 2 and 3 are simplified pictorial illustrations of additional views of the disk of FIG. 1.

Reference is now made to FIG. 2 which depicts an exploded view of an assembled disk unit 100, constructed and operative in accordance with embodiments described herein. Assembled disk unit 100 comprises disk 10 and paddle card 20 as described with reference to FIG. 1. Assembled disk unit 100 may also comprise disk carrier and mounting bracket 40. Paddle card 20 is configured to attach to the end panel of disk 10 to effectively redirect signal/power connector 11 approximately 90 degrees as illustrated hereinabove in FIG. 1. Disk carrier 30 may be configured to hold and stabilize disk 10 together with paddle card 20. Mounting bracket 40 may be affixed to disk carrier 30 and may serve to further enclose disk 10 in disk carrier 100, and/or may provide leverage when installing/removing disk unit 100 by inserting and/or removing paddle card 20 into/from backplane slot 220 (FIG. 1). It will be appreciated by one of ordinary skill in the art that the embodiments described herein may support paddle card 20 redirecting signal/power connector 11 at angles slightly different from 90 degrees, within the constraints provided by a top panel (not shown) of the 2RU disk enclosure. i.e., other redirection angles may be supported as long as when paddle card 20 is attached to disk 10. Disk 10 may still fit within the 2RU disk enclosure when closed by a top panel.

Figure 3:
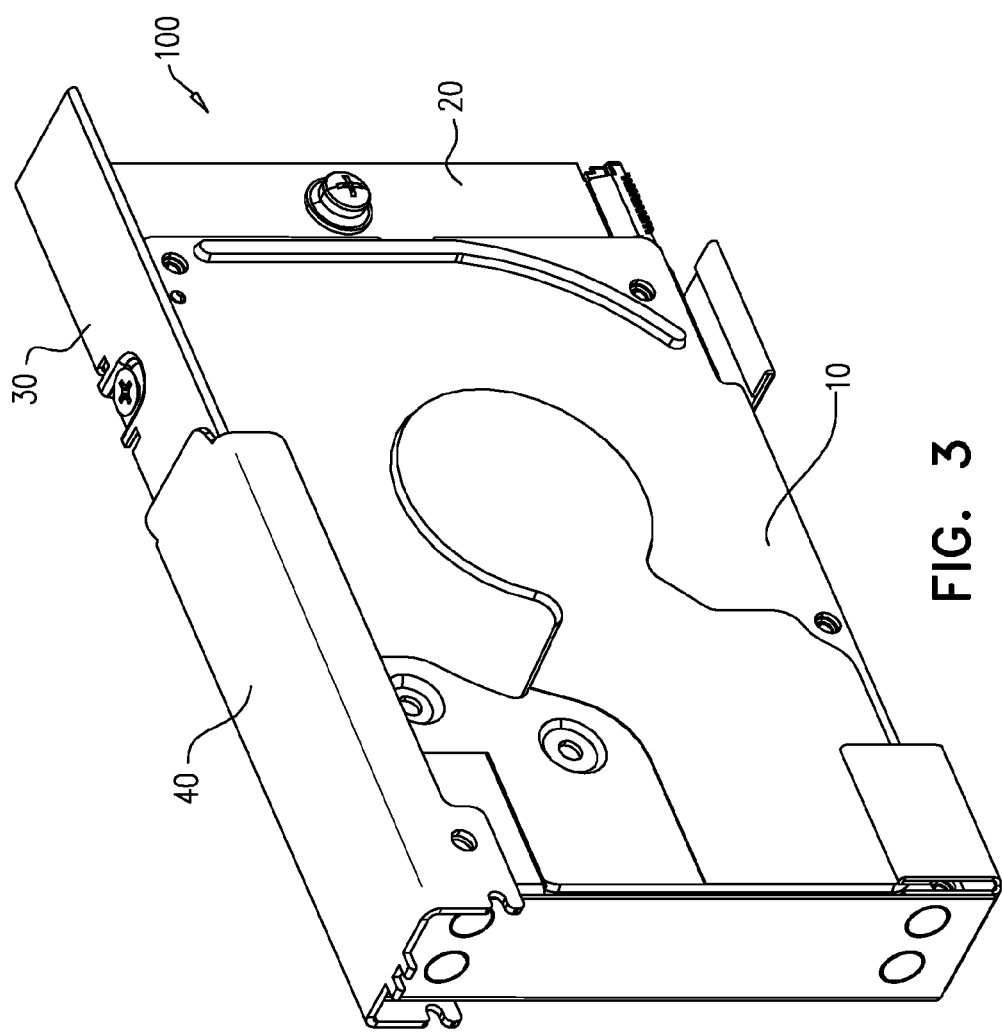

Reference is now also made to FIG. 3 which depicts an assembled disk unit 100. Paddle card 20 may be attached to disk 10, which in turn is screwed into disk carrier 30, with mounting bracket 40 riveted into the top of disk carrier 30.

Figure 4:
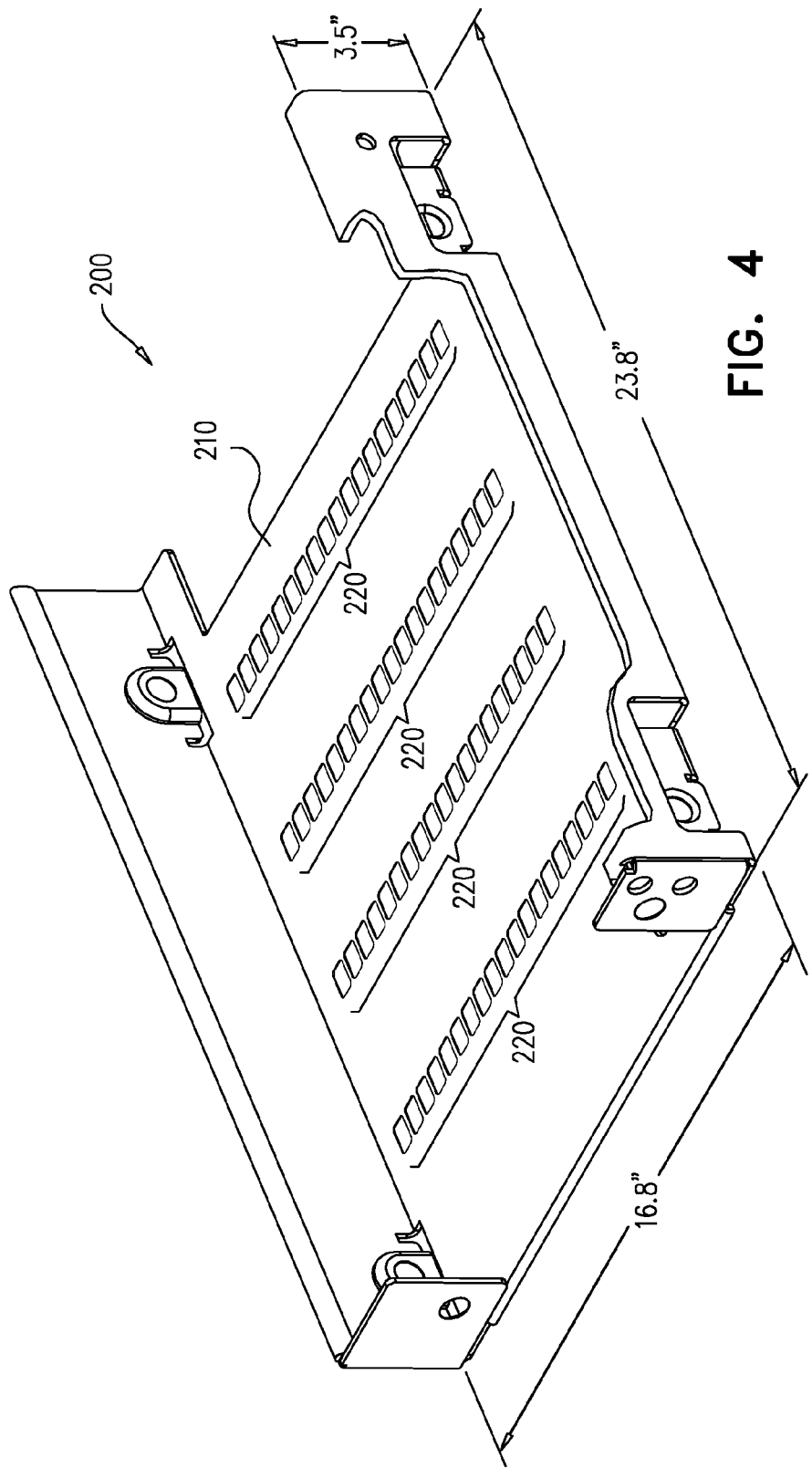
FIG. 4 is a simplified pictorial illustration of a two rack unit (2RU) disk array enclosure, constructed and operative in accordance with embodiments described herein.

Reference is now made to FIG. 4 which is a simplified pictorial illustration of an exemplary 2RU disk array enclosure 200, constructed and operative in accordance with embodiments described herein. Enclosure 200 comprises inner bottom panel 210 on which a multiplicity of backplane slots 220 are installed. In the exemplary embodiment of FIG. 4, there are four rows of nineteen backplane slots 220 each. It will be appreciated by one of ordinary skill in the art that the embodiments described herein may support other configurations as well. For example, there may be only two or three rows of backplane slots 220. However, due to the length of 2.5 inch disks 10, there may be no more than four such rows. Similarly, there may be more or less than nineteen backplane slots per row, depending on the overall width of disk carrier 30.

Figure 5:
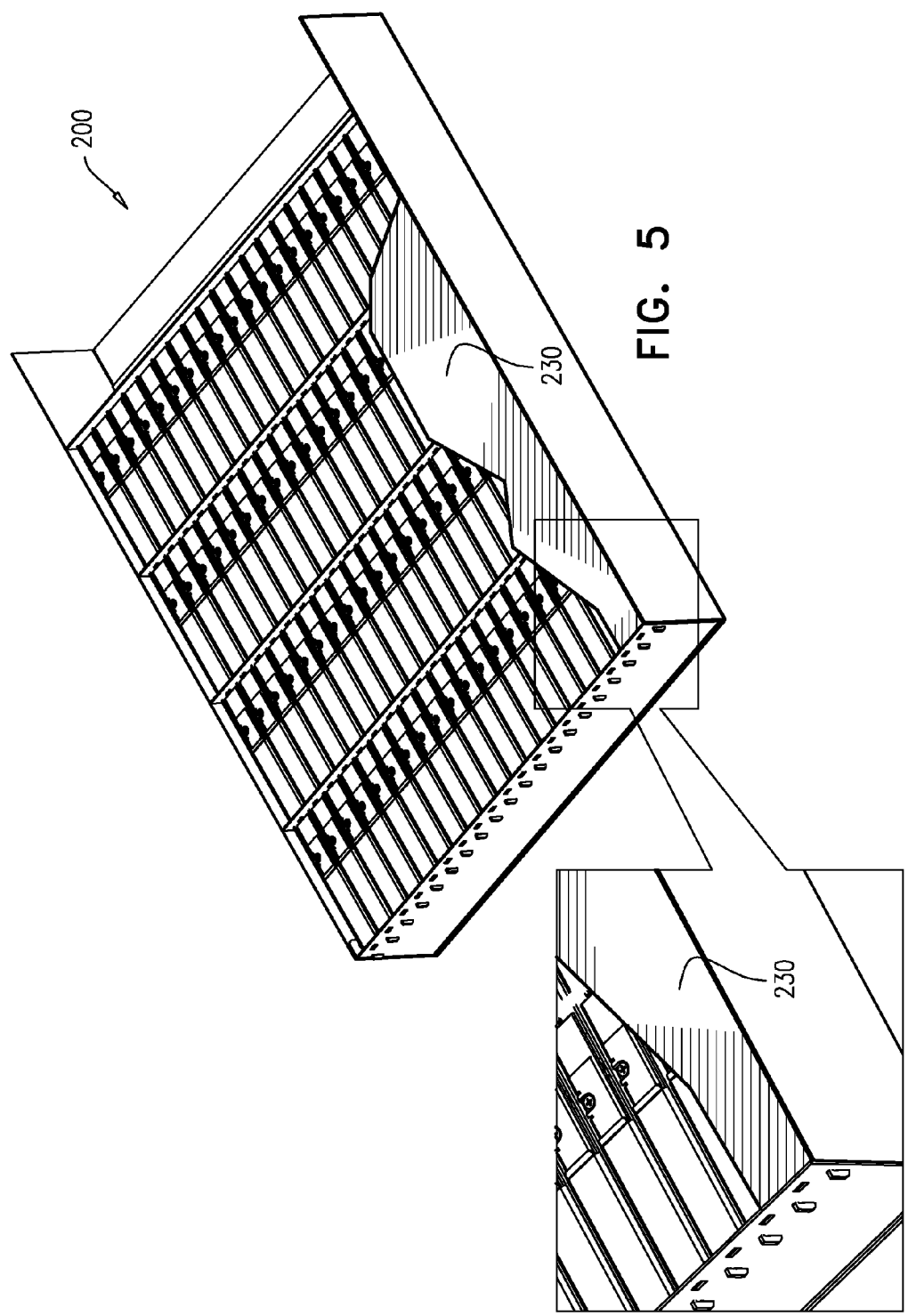
FIG. 5 is a simplified pictorial illustration of the 2RU disk array enclosure of FIG. 4 slotted with multiple 2.5 inch disks.

Reference is now made to FIG. 5 which represents the simplified pictorial illustration of the 2RU disk array enclosure of FIG. 4 slotted with multiple disk units 100 (FIG. 3). It will be appreciated by one of ordinary skill in the art that the embodiment of FIG. 5 represents an efficient use of the inner volume of 2RU disk array enclosure 200; seventy-six disk units 100 may be mounted inside enclosure 200, thereby increasing capacity by over 100% relative to the front panel and extendable drawer options described hereinabove. Additionally, each disk unit 100 may be attached directly to a backplane slot 220, thereby reducing the complexity of inherent risk of cable connections. It will also be appreciated that each individual disk unit 100 may be accessed and serviced as needed via top panel 240 (partially shown to enable viewing of disk units 100) of enclosure 100.

It will be appreciated by one of ordinary skill in the art that the embodiments as described herein may effectively increase the capacity of existing 2RU enclosures, thereby producing a high density disk array enclosure. It will similarly be appreciated that by reducing reliance on connecting cables and/or moving parts with the enclosures, the embodiments as described herein may also serve to reduce the complexity of the configuration and maintenance of such enclosures.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A disk array enclosure comprising:
   a two rack (2RU) enclosure configured with a multiplicity of rows of backplane slots on an inner bottom panel of said 2RU enclosure; and
   a multiplicity of 2.5 inch disks mounted lengthwise in parallel to said inner bottom panel; and
   a multiplicity of paddle cards, each connected to one of said 2.5 inch disks and slotted into one of said backplane slots.

2. The disk array enclosure according to claim 1 wherein each of said paddle cards is connected to at least a signal/power connector on one of said 2.5 inch disks.

3. The disk array enclosure according to claim 2 wherein each of said paddle cards provides connectivity between an associated said signal/power connector and bone of said backplane slots.

4. The disk array enclosure according to claim 2 wherein said signal/power connector is positioned at approximately 90 degree angle from said backplane slots.

5. The disk array enclosure according to claim 2 wherein said signal/power connector is a Serial General Purpose Input/Output (SGPIO) bus according to the SFF-8485 standard.

6. The disk array enclosure according to claim 1 and further comprising:
   a removable top panel.

7. The disk array enclosure according to claim 1 wherein said multiplicity of rows comprises at least two rows.

8. The disk array enclosure according to claim 1 wherein said multiplicity of rows comprises four rows.

9. A method for efficient allocation of storage volume in a two rack unit (2RU) disk array enclosure, the method comprising:
   installing backplane slots on an inner bottom panel of said 2RU disk array enclosure;
   rotating an angle of signal/power connectors by approximately 90 degrees on a multiplicity of 2.5 inch disks by connecting each of said signal/power connectors to a first connector on a paddle card interface, wherein said paddle card interface is configured with a second connector disposed at an approximately 90 degree angle to said first connector; and
   for each of said 2.5 inch disks, connecting said second connector to one of said backplane slots.

10. The method according to claim 9 and further comprising:
    accessing said multiplicity of 2.5 inch disks via a removable upper panel on said 2RU disk array enclosure.

11. The method according to claim 9 wherein said installing comprises:
    installing said backplane slots in at least two rows along said inner bottom panel.

12. The method according to claim 9 wherein said signal/power connectors are Serial General Purpose Input/Output (SGPIO) buses according to the SFF-8485 standard.

13. The method according to claim 9 wherein said installing comprises:
   installing said backplane slots in at least four rows along said inner bottom panel.

* * * * *

UNITED STATES PATENT AND TRADEMARK OFFICE
CERTIFICATE OF CORRECTION

PATENT NO. : 9,715,258 B1
APPLICATION NO. : 15/077929
DATED : July 25, 2017
INVENTOR(S) : Yun Bai et al.

It is certified that error appears in the above-identified patent and that said Letters Patent is hereby corrected as shown below:

On the Title Page

Item (56), Other Publications, Column 2, Line 3, "_.jpg" should read as --_x1.jpg--.

Signed and Sealed this
Seventh Day of November, 2017

Joseph Matal
*Performing the Functions and Duties of the
Under Secretary of Commerce for Intellectual Property and
Director of the United States Patent and Trademark Office*